United States Patent [19]

Gilbert

[11] Patent Number: 5,430,430

[45] Date of Patent: Jul. 4, 1995

[54] METHOD OF MANAGING ELECTRIC POWER ON THE BASIS OF TARIFF SCHEDULES, IN A NETWORK WITHIN A DWELLING OR THE LIKE

[75] Inventor: Jerome Gilbert, Levallois-Perret, France

[73] Assignee: Euro CP s.a.r.l., L'Hay les Roses, France

[21] Appl. No.: 44,037

[22] Filed: Apr. 8, 1993

[30] Foreign Application Priority Data

Jul. 3, 1992 [EP] European Pat. Off. ........... 92401922

[51] Int. Cl.⁶ .......................... H04Q 9/00; H02I 13/00
[52] U.S. Cl. .......................... 340/310.01; 340/310.06; 340/825.54; 340/870.02
[58] Field of Search ............ 340/870.02, 870.03, 340/310 A, 310 R, 310 CP, 825.17, 310.01, 310.06, 825.54; 307/35; 364/492, 493

[56] References Cited

U.S. PATENT DOCUMENTS

| | | | |
|---|---|---|---|
| 4,135,101 | 1/1979 | Young et al. | 340/310 A |
| 4,264,960 | 4/1981 | Gurr | 340/310 A |
| 4,302,750 | 11/1981 | Wadhwani et al. | 340/870.12 |
| 4,348,750 | 9/1982 | Emerson et al. | 340/310 A |
| 4,390,876 | 6/1983 | Bjorklund et al. | 340/310 A |
| 4,510,398 | 4/1985 | Culp et al. | 307/35 |
| 4,694,192 | 9/1987 | Payne et al. | 807/39 |

FOREIGN PATENT DOCUMENTS

| | | | |
|---|---|---|---|
| 0208597 | 1/1987 | European Pat. Off. | H02J 3/14 |
| 0250320 | 12/1987 | European Pat. Off. | H02J 3/14 |
| 0372961 | 6/1990 | European Pat. Off. | H02J 3/14 |
| 0486983 | 5/1992 | European Pat. Off. | H02J 13/00 |

Primary Examiner—James J. Groody
Assistant Examiner—Glenton B. Burgess
Attorney, Agent, or Firm—Young & Thompson

[57] ABSTRACT

The invention relates to a method allowing the management of electric power on the basis of the tariff schedules in force in a network (20) within a dwelling. The method according to the invention is based on communication which is established automatically between domestic appliances (201–205, 207, 210) and a so-called electric power manager unit (211) of which the task is, in particular, to coordinate the management of tariff schedules. The method makes it possible to slave the operation of appliances (201–205, 207, 210) to the tariff status in force which is known to the manager (211) by means of a link with an electricity meter (200) fitted in the network (20).

13 Claims, 4 Drawing Sheets

FIG_1

FIG_2

FIG_3

METHOD OF MANAGING ELECTRIC POWER ON THE BASIS OF TARIFF SCHEDULES, IN A NETWORK WITHIN A DWELLING OR THE LIKE

BACKGROUND OF THE INVENTION

1. Field of the Invention

The present invention relates to a method of managing electric power on the basis of tariff schedules, in a network within a dwelling, which effectively complements the consumption planning capabilities usually offered by home networks.

The term "dwelling" is construed as any self-contained or multi-occupancy premises and, more generally, any block of flats, place of living or working.

Management of tariff schedules involves using information on tariff changes supplied directly or indirectly by the electric power distributor to control and monitor the switching on of certain appliances under the most favourable economic conditions to the user.

2. Description of the Related Art

Management of tariff schedules is currently performed using a relay that is remote controlled by means of signals directly transmitted by the electric power distributor or locally controlled by a clock and situated close to the electricity meter which makes it possible to slave the operation of a load to the availability of the so-called off-peak tariff. Although use of the "off-peak" tariff is advantageous for all appliances that consume large amounts of power such as washing machines, tumble driers, dishwashers, heating appliances etc., the current solution is generally only applied to the production of hot water for sanitary purposes given the complexity of the installation required in order to extend this service to other appliances in the house and, more generally, in the dwelling.

The other approach that has been explored is to program the operating schedule of appliances at times which coincide with availability of the "off-peak" tariff but this expensive and inconvenient solution is becoming more difficult to implement in practice because of tariff changes which electricity distributors are attempting to link more directly to the supply and demand for power.

The purpose of the invention is to overcome these drawbacks by proposing a method of managing electric power on the basis of tariff schedules in a network within a dwelling where the network includes appliances capable of 2-way communication with each other and means of determining the electric power tariff schedule which is in force in that dwelling.

SUMMARY OF THE INVENTION

According to the invention, when a tariff change signal occurs at the level of the means of determining the electric power tariff schedule in force in the dwelling, this information is picked up by a so-called manager unit which is connected to the network and this manager generates a message that contains a code which represents the tariff in force and a binary information element indicating whether or not the tariff can be regarded as economical, the said message being broadcast with a method of addressing which limits its logical range to those appliances in the dwelling which are associated with the said means of determining the electric power tariff schedule in force in the dwelling.

Using the method according to the invention, the network user can utilize the installed appliances connected to the network in a more rational and economical way because the manager transmits only to those appliances of which the operation is compatible with the tariff information method, thus allowing these appliances to change to the economical operating mode which is appropriate to them. In addition, the method according to the invention can advantageously be associated with a method of managing electric power which uses load disconnection/reconnection operations.

BRIEF DESCRIPTION OF THE DRAWINGS

Other features and advantages of the invention will be apparent from the following description, reference being made to the appended drawings by way of non-exhaustive examples.

DESCRIPTION OF THE PREFERRED EMBODIMENTS

The method of managing tariff schedules according to the invention is applicable to a home network 20 which links several domestic appliances which communicate with each other and use electric power in order to fulfil their functions. The method according to the invention is based on communication which is established automatically between the domestic appliances and a so-called electric power manager unit whose task is to coordinate management of tariff schedules and of power in a house.

Figure 2:
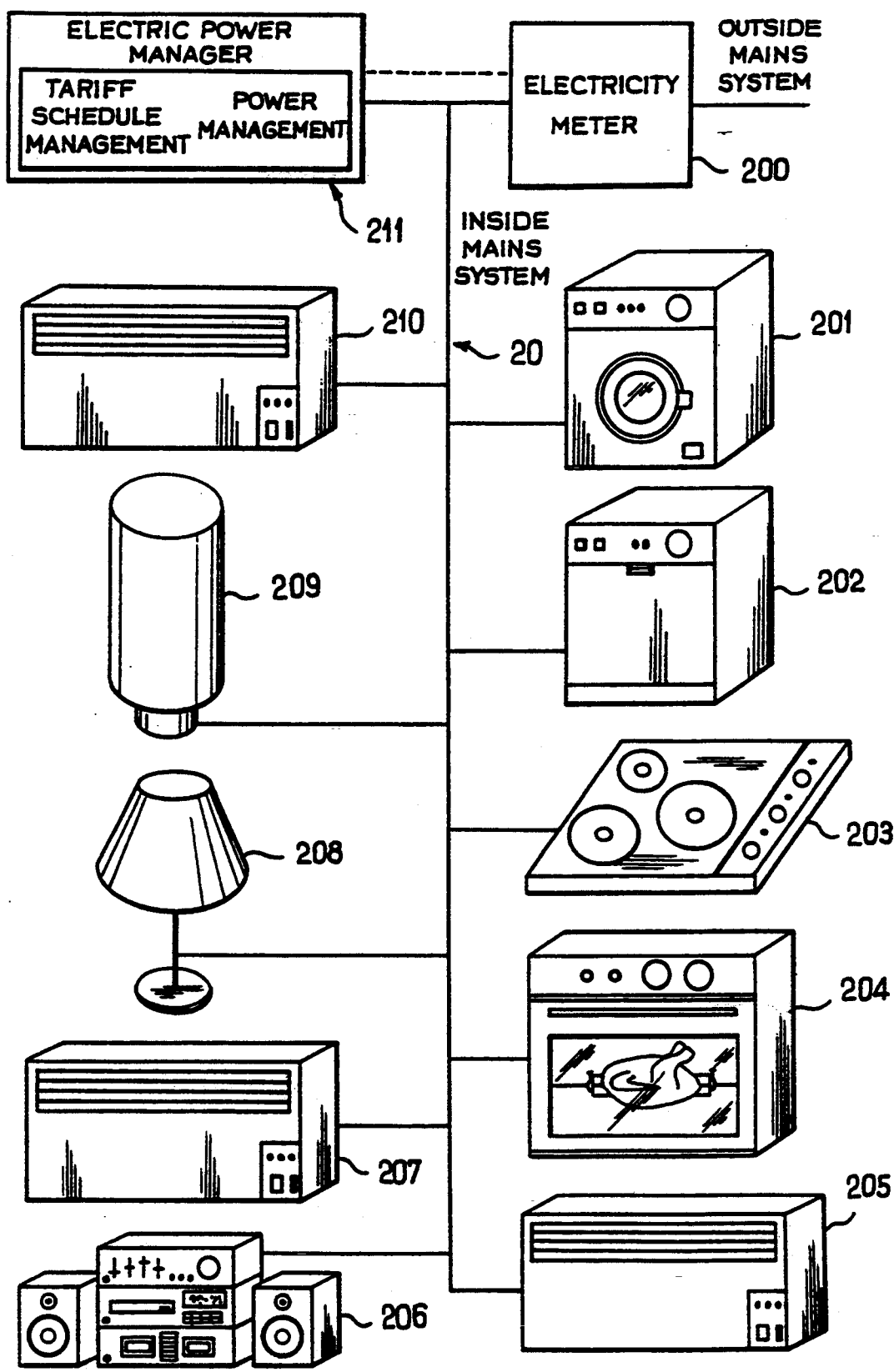
FIG. 2 shows an example of a home network which may involve use of the method according to the invention.

With reference to FIG. 2, all the above mentioned appliances are capable of 2-way communication with each other in a home network 20 which can use transmission media such as carrier currents, a cable, fiber-optic or radio-frequency cables. By way of example, the following items are connected to this network 20:

a washing machine 201 and a dishwasher 202, hot plates 203 and an oven 204, electric convection heaters 205, 207, 210, audio and video equipment 206, lighting fittings 208, 209.

Network 20 is also equipped with an electricity meter 200 which interfaces with an outside mains system and an electric power manager unit 211 of which the construction is described later. Electricity meter 200 is preferably an electronic model capable of communicating directly with manager 211 without the network user taking any action.

The structure of the most suitable network for implementing this method is a multi-master, multi-slave structure with possible role swapping where the method of accessing the transmission medium is ideally a multiple access method with monitoring and collision management.

Figure 1:
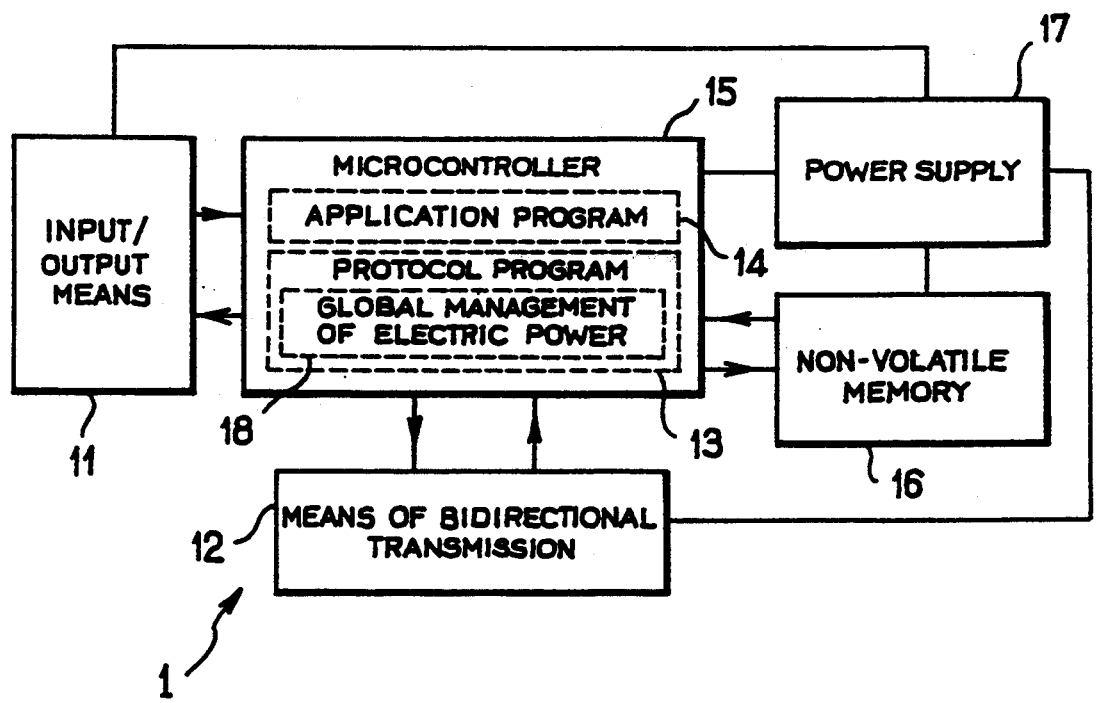
FIG. 1 shows the block diagram of an appliance that can use this method according to the invention and perform combined power and tariff schedule management.

With reference to FIG. 1, the method according to the invention can be implemented in appliances 1 which have at least:

a microcontroller 15;

non-volatile rewriteable memory 16, e.g. EEPROM, backed up RAM or a FLASH memory;

a means of bidirectional transmission 12 suitable for the medium, e.g. a modem for carrier currents, a radio-frequency or infrared transmitter/receiver or an interface to support transmission by wire;

means of input/output 11 and an application program 14 that depend on the functions offered by each appliance;

an appropriate electric power supply 17;

a program that provides a communication protocol 13 and global management of electric power 18 and, more generally, which uses a higher-ranking method in which the method according to the invention is a subset thereof.

Manager 211, in FIG. 2, situated close to electricity meter 200 converts and broadcasts, within network 20, tariff information supplied to the user by the electric power distributor. Manager 211 automatically broadcasts a message with each change of tariff status and each appliance in the network can interrogate it at any time in order to ascertain the tariff which is in force.

The method according to the invention is based on the facility that some electrical appliances offer the user which allows them to be switched on in so-called "ECO" (economical) mode, possibly at several rates in the case of the most sophisticated appliances and which slaves the operation of the appliance to the electric power tariff status. The tariff conditions associated with "ECO" operating status are determined either for all the appliances in the house in the manager or individually in each appliance. The first solution is suitable for simple domestic electrical appliances such as washing machines, dishwashers, tumble driers etc., whereas the second solution is applicable to more sophisticated appliances and opens up numerous possibilities in the case of multi-part tariffs.

The method according to the invention makes it possible for appliances which operate according to the two principles mentioned above to coexist within a single network. In fact, the message that the tariff schedule manager automatically sends in the event of a tariff change or at the request of an appliance contains both a code that represents the tariff in force, thus allowing sophisticated appliances to interpret the nature of this tariff locally, and a binary information element generated by the manager which indicates throughout the network whether or not the tariff in force is economical.

Figure 3:
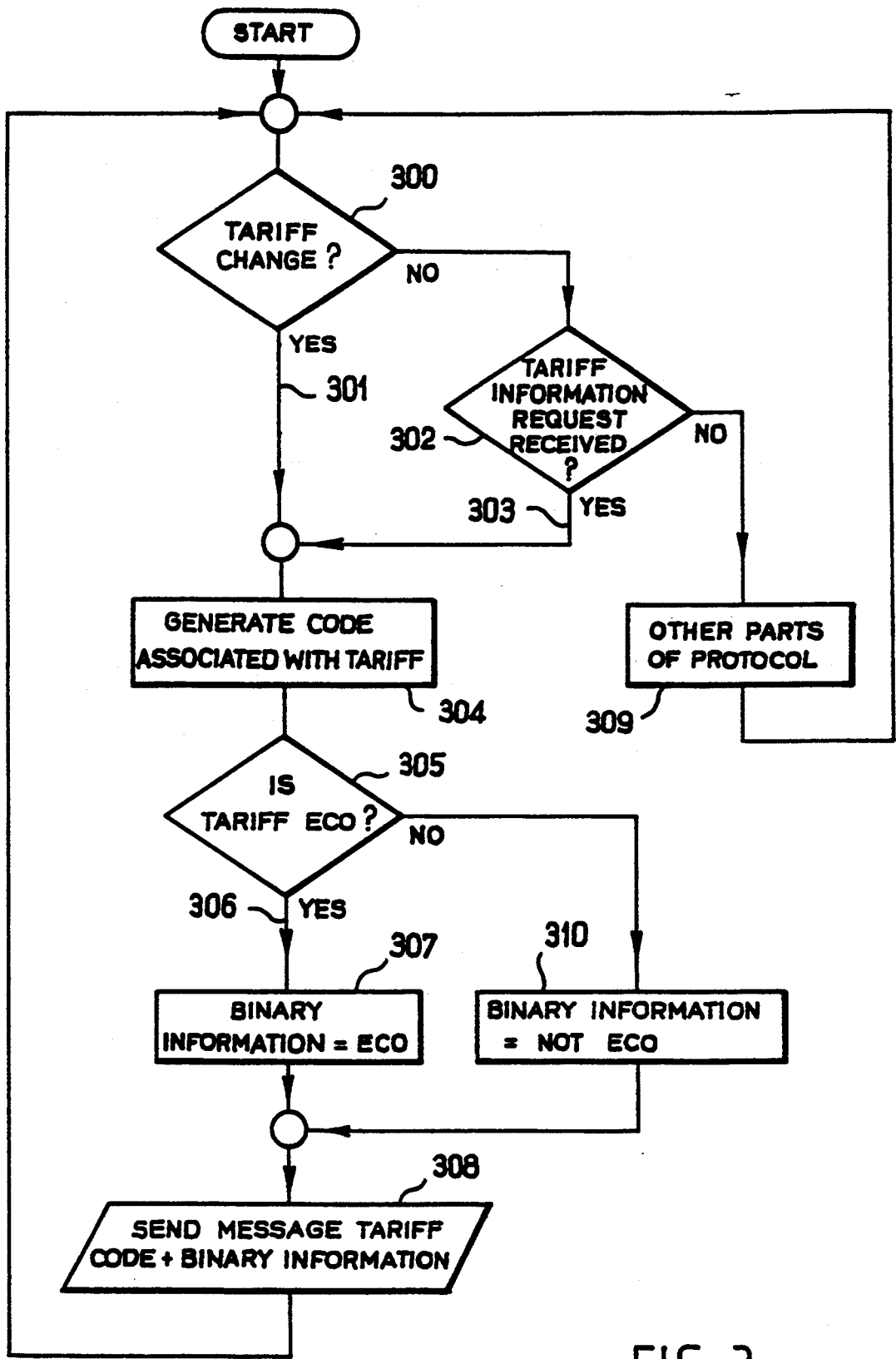
FIG. 3 shows the various stages in the method according to the invention carried out by the electric power manager.

The stages in the method according to the invention carried out by the manager are as follows, reference being made to FIG. 3:

a detection test 300 for a tariff change in the means of determining the electric power tariff schedule which is in force in the dwelling, e.g. electricity meter 200. If there is no change, a test is performed to detect a tariff information request 302 originating from an appliance in the network; if no request is received, the other parts of the protocol 309 are executed before returning to the initial test 300;

if there is a positive response 301, 303 to the two previous tests 300, 302, a code representing the tariff in force is generated 304;

a test 305 used to determine whether or not the tariff in force can be regarded as economical 305; this test is only meaningful if the tariff schedule has at least two levels; if the tariff is economical 306, the binary information element assumes the value "ECO" 307, otherwise it assumes the value "NOT ECO" 310;

sending a tariff information message 308 with a method of addressing which limits its logical range to those appliances in the dwelling handled by the manager, this message containing the code which represents the tariff and the binary information element.

Figure 4:
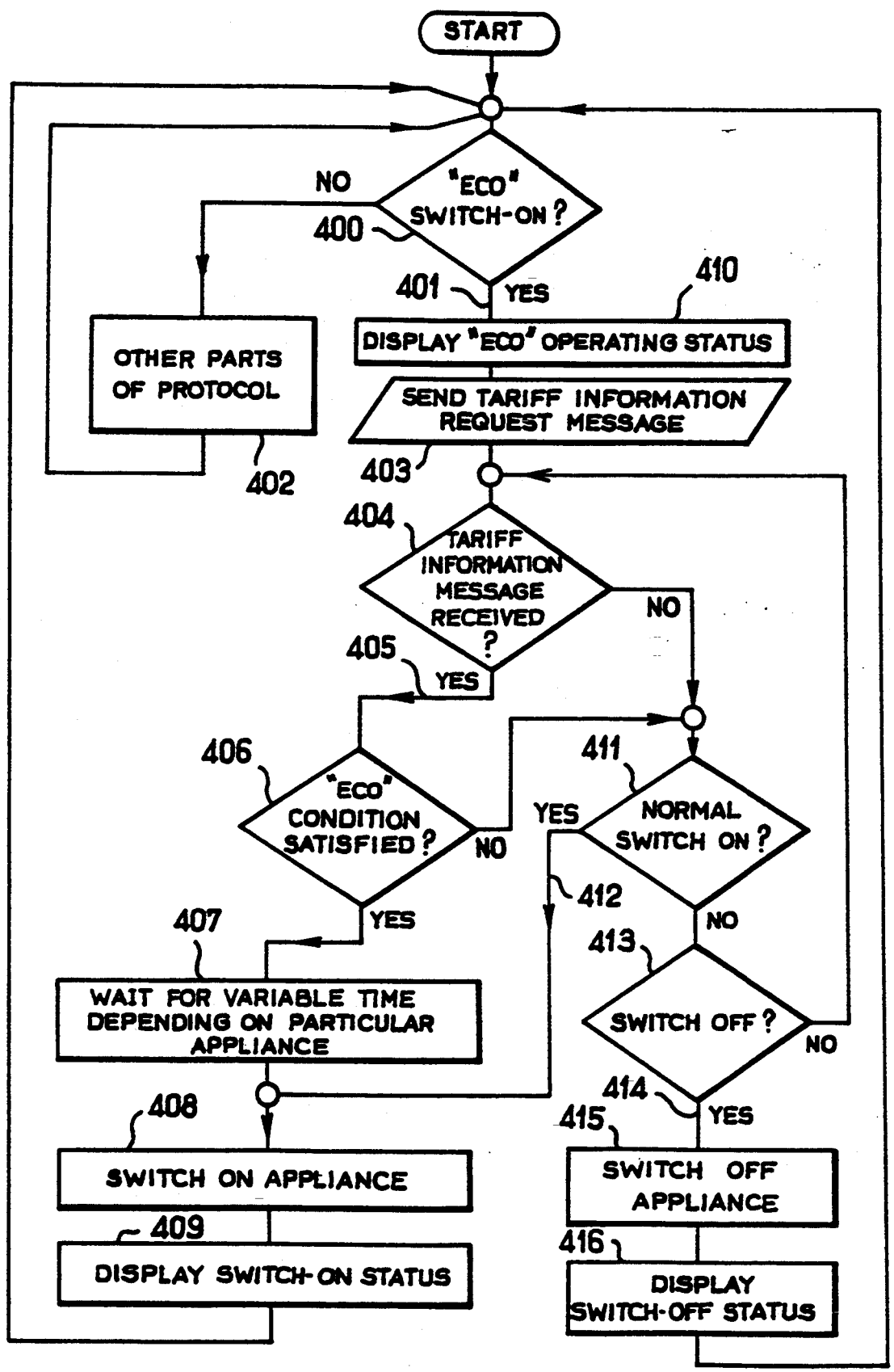
FIG. 4 shows the various stages in the method according to the invention which are followed by the appliances in the network.

The stages in the method according to the invention which concern appliances which are capable of analyzing tariff information are as follows, reference being made to FIG. 4:

A test 400 on the status of an "ECO" SWITCH-ON button 400; if the result of the test is negative, the other stages in the communication and/or management protocol of which the method according to the invention is a subset and, more generally, any higher-ranking method with which the method according to the invention is compatible, are executed 402; if "ECO" SWITCH-ON is requested;

Display 410 of the "ECO" SWITCH-ON status;

Sending 403 of a general broadcast tariff information request message with a method of addressing that limits the logical range of the message to those appliances that have the same network address;

Waiting 404 to receive a tariff information message from the manager in the dwelling; if such a message is not received, the method tests 411 the status of the normal SWITCH-ON button; if normal switch-on is requested 412, the appliance is switched on immediately 408 and this status is displayed 409, then the other stages in the protocol are executed 402; if normal switch-on is not requested, the next stage is test 413 on a switch-off button; if the result of the test is positive 414, the appliance is switched off 415, this status is displayed 416, then the other stages in the protocol are executed 402; if the result of test 413 is negative, the method returns to the previous tariff information message stage 404;

If a tariff information message is received 405, the content of this message is examined to ascertain whether or not the conditions authorising switch-on are satisfied 406; if this is not the case, the method returns to the stage involving the test 411 on the normal switch-on button, if the conditions are satisfied a waiting period of which the duration varies for each appliance and which is intended to spread the peak current which, without this precaution, could trip the circuit breaker in the indoor mains system;

and return to the other parts of the protocol.

Note that the higher-ranking method with which the method according to the invention is compatible may include other possibilities of switching on or switching off an appliance.

In addition, a timeout can be provided which is initiated as soon as an appliance fails to receive a response to a tariff information request, thus making it possible to automatically switch from waiting mode in which normal switch-on 411 and switch-off 413 tests are not satisfied, particularly if the manager is not present or in the event of malfunctioning of the network and making it possible to go to stage 415 directly, switching off the appliance.

Note that certain appliances, for instance heating, freezing or other appliances, may use the signal indicating non-availability of "ECO" tariff conditions to switch themselves off.

According to another useful embodiment of the method according to the invention, it is proposed to use two ways of starting a functional cycle of an appliance:

Immediate starting where preference is given to the time,

"Off-peak" starting where preference is given to energy savings.

This guarantees the user that a cycle is started under optimum tariff conditions, something which cannot be obtained reliably by simple deferred starting.

Any action on an appliance of which the operation is compatible with the embodiment of the invention: immediate switch-on or "off-peak" switch-on, triggers an instantaneous reaction by local low-power devices, for example indicator lamps, displays and fans for human factors reasons due to the need for an immediate response by the appliance to action by the user; if "off-peak" starting was requested, the user is given "waiting for off-peak" feedback information in the form, for instance, of a flashing "off-peak start" indicator lamp or by any other equivalent means. When starting becomes effective on receiving an "ECO" tariff message, the indicator lamp no longer flashes and remains lit continuously until the appliance is switched off.

The tariff information messages sent by the manager contain three types of information:

Binary information indicating whether the tariff event can be classified in the "normal tariff" or "economical tariff ECO" category;

A main tariff event D coded in one byte. As a non-exhaustive example, bit 7 may indicate whether prior notification (bit 7=0) or an actual tariff change (bit 7 =1) is involved, bits 4 to 6 may indicate the type of tariff and bits 0 to 2 may indicate the tariff rate reached in relation to a given type of tariff;

Optional predictive information based on the observation of various tariff changes over a 24-hour period preceding the sending of each tariff information message. Only actual tariff status changes are taken into account, not prior notification. This optional information consists of one or two blocks of 2 bytes each depending whether the number of tariff status changes stored during the preceding 24-hour period is 1, 2 or more. In the case of more than two observed tariff status changes, only the next probable changes are indicated. Each information block contains a tariff event D and two bytes which represent the time between the instant when the frame was sent and the instant of the previously observed tariff change. The tariff event D is similar to the main tariff event D apart from the significance of bit 7.

Tariff information can be analyzed at various levels:

In the most simple appliances, only the value of bit 3 in the main tariff status D may be analyzed in the event of an actual tariff change;

Some sophisticated appliances may analyze the information specifying the type of tariff and the tariff rate;

Other appliances may analyze the information relating to prior notification;

The most sophisticated appliances may analyze any optional information in order to inform the consumer of the estimated waiting time before service is obtained or, by simple calculation, the time at which service will be obtained.

Obviously, the invention is not confined to the examples described and many changes can be made to these examples without going outside the scope of the invention.

Thus, in order to carry tariff information within the network, one can envisage any type of wire or wireless medium with or without a carrier current. In addition, tariff change information may be supplied to the manager by observing the status of a switching device controlled remotely by carrier current in the network outside the dwelling by the electric power distributor or controlled locally by a clock.

Also, the waiting period which precedes actual switch-on of the appliance can, if applicable, be omitted if the tariff information message in response to an "ECO" economical switch-on request satisfies the ECO condition immediately.

In addition, because ECO tariff conditions are often obtainable at night, the duration of the waiting period may make allowance for the nature of the function fulfilled by the appliance. For instance, it may be preferable to actually switch on a dishwasher shortly after the occurrence of ECO tariff conditions so that the dishes have time to dry whereas other appliances such as washing machines or tumble driers may usefully wait longer before actually being switched on in order to prevent creasing of laundry if it remains in the machine too long after the cycle has ended.

I claim:

1. A method of managing electric power on a basis of tariff schedules in a network within a dwelling comprising the steps of:

equipping appliances using said electric power within said dwelling with means for two-way communication between appliances and between said appliances and an electric power tariff schedule determining means for determining the electric power tariff schedule in force for that dwelling;

detecting, using said electric power tariff schedule determining means, an occurrence of a tariff change signal;

generating, upon receipt of said tariff change signal, by a manager unit connected to said network, a message containing a code representing the tariff in force and a binary information element indicating whether said tariff can be regarded as economical;

broadcasting, by said manager unit, said message using an addressing scheme limiting a logical range of said broadcasting to appliances in said dwelling connected to said electric power tariff schedule determining means; and selectively controlling, using said manager unit, an operation of said appliances connected to and compatible with said network based on said electric power tariff schedule in force at a given time.

2. Method according to claim 1, further comprising the steps of:

sending, by appliances that require knowledge of the tariff in force, a tariff status request message to said manager unit using an addressing scheme limiting a logical range of said tariff status request message to only appliances in said dwelling;

broadcasting, in response to said tariff status request message, said message over said network; and said appliances connected to and compatible with said manager unit modifying their operation according to said message received over said network.

3. Method according to claim 2, wherein said manager unit carries out the following steps:

conducting a detection test to detect said tariff change signal followed by, if no tariff change signal is detected;

conducting a test to detect a presence of a tariff status request message from an appliance in the network and, if no tariff status request message is detected by said manager unit;

executing further operations before returning to said step of conducting a detection test to detect said tariff change signal;

generating said code representing the tariff in force when there is a positive response to both said tests to detect said tariff change signal and said test to detect said tariff status request;

conducting a test to determine whether the tariff in force can be regarded as economical; and making said binary information element assume a value "ECO" if the tariff in force is regarded as economical, and making said binary information element assume a value "NOT ECO" if said tariff in force is not regarded as economical.

4. Method to according to claim 2, wherein each appliance in said network capable of analyzing tariff information carries out the steps of:

conducting a test regarding a status of a "ECO" switch-on button of the appliance followed by the step of executing, if a result of said status test is negative, further steps in said method before returning to conduct said status test, and if said "ECO" switch-on button is depressed;

displaying said "ECO" switch-on status;

broadcasting to said manager unit a tariff status request message using an addressing scheme limiting a logical range of said tariff status request message to other appliances in said network;

waiting to receive said message containing said code representing the tariff in force and said binary information element from said manager unit; and conducting a normal switch-on button and switch-off button status tests, if said message is not received.

5. Method according to claim 4, wherein, on completion of said normal switch-on button and said normal switch-off button status tests, said method further comprises the steps of:

immediately switching on appliances having said normal switch-on button depressed;

displaying said status of said normal switch-on button;

carrying out further processing;

if said normal switch-on button was not depressed; and carrying out a test on a status of a switch-off button.

6. Method according to claim 5, wherein if a result of said status of said switch-off button is positive, said method further comprises the steps of:

switching off appliances having said switch-off button depressed;

displaying said status of said switch-off button;

carrying out further processing, and if a result of said status of said switch-off button test is negative; and returning to said step of waiting for said message.

7. Method according to claim 6, wherein if said message is received, said method further comprises the steps of:

examining said binary information element to ascertain whether conditions authorizing switch-on are satisfied and, if said conditions are not satisfied, performing said normal switch-on button and said normal switch-off button status tests.

8. Method according to claim 7, wherein if said examination of said binary information element reveals that said binary information element contains an economic tariff signal, said method further comprises the steps of: and carrying out a waiting period before each appliance is switched-on, said waiting period varying depending upon the appliance to be turned on.

9. A method according to claim 6, wherein if said message is not received on completion of said waiting for said message step, said method further comprises the step of:

initiating a time out of a predetermined duration when said step of waiting for said message is completed, and, if none of said normal switch-on and said normal switch-off button status tests are satisfied; and switching off each appliance for which said normal switch-on and said normal switch-off button status tests are not satisfied.

10. Method according to claim 1, wherein said appliances have a capability of carrying out the following step:

analyzing said message to determine a non-availability of said economic tariffs in order to switch themselves off.

11. Method according to claim 1, wherein said method is combined with a method of managing electric power to allow a global management of electric power and a network within a dwelling.

12. Method according to claim 1, wherein if said message sent by said manager unit contains, in addition to said binary information element, a main tariff event D to indicate whether a prior notification or an actual tariff change is involved, and to supply information relating to a type of tariff and a tariff rate to said appliances within said network.

13. Method according to claim 10, wherein said main tariff event D also comprises optional information representing a change of tariff status which occurred during a predetermined period preceding said step of broadcasting said message onto said network.

* * * * *